(12) United States Patent
Young (10) Patent No.: US 11,388,897 B2
(45) Date of Patent: Jul. 19, 2022

(54) DECK MOUNT FISHING ROD HOLDER APPARATUS

(71) Applicant: James Young, Ridgeville, SC (US)

(72) Inventor: James Young, Ridgeville, SC (US)

( * ) Notice: Subject to any disclaimer, the term of this patent is extended or adjusted under 35 U.S.C. 154(b) by 88 days.

(21) Appl. No.: 16/936,510

(22) Filed: Jul. 23, 2020

(65) Prior Publication Data
US 2022/0022439 A1 Jan. 27, 2022

(51) Int. Cl.
*A01K 97/10* (2006.01)
*A01K 97/00* (2006.01)

(52) U.S. Cl.
CPC .............. *A01K 97/10* (2013.01); *A01K 97/00* (2013.01); *A45F 2200/0566* (2013.01)

(58) Field of Classification Search
CPC .. A01K 97/00; A01K 97/10; A45F 2200/0566
USPC .......................... 248/512, 514, 520, 538, 540
See application file for complete search history.

(56) References Cited

U.S. PATENT DOCUMENTS

| | | | |
|---|---|---|---|
| 4,603,500 A * | 8/1986 | Harrison, Sr. ......... | A01K 97/10 248/514 |
| 4,645,167 A | 2/1987 | Hardwick | |
| 4,823,723 A | 4/1989 | Brooks | |
| 4,964,233 A * | 10/1990 | Benson .................. | A01K 97/10 43/17 |
| D352,089 S * | 11/1994 | Barber .......................... | D22/147 |
| 5,438,789 A * | 8/1995 | Emory .................... | A01K 97/10 248/514 |
| D372,956 S * | 8/1996 | Mills ............................ | D22/147 |
| 5,588,630 A * | 12/1996 | Chen-Chao ............. | F16C 11/10 248/514 |
| D390,308 S | 2/1998 | Sieland | |
| 5,761,844 A * | 6/1998 | Horschel ................ | A01K 97/10 248/131 |
| D414,239 S * | 9/1999 | Lovelady ..................... | D22/147 |
| 5,987,804 A * | 11/1999 | Shearer .................. | A01K 97/10 43/21.2 |
| 6,050,020 A * | 4/2000 | Sizemore ............... | A01K 97/11 43/15 |
| 6,289,627 B1 * | 9/2001 | Gibbs .................... | A01K 97/10 43/21.2 |
| 6,530,170 B1 * | 3/2003 | Sweeney ................ | A01K 97/10 211/70.8 |

(Continued)

OTHER PUBLICATIONS

Sanus Systems, XF228-B1 42-Inch to 90-Inch TVs HD Pro Full-Motion Flat Panel Mount, (Jul. 28, 2009) (Year: 2009).*

*Primary Examiner* — Timothy D Collins
*Assistant Examiner* — Nicholas Leo Seneczko (57) ABSTRACT

A deck mount fishing rod holder apparatus for securing fishing rods without clamps includes a base having a base top side, a base bottom side, a mounting portion and a plurality of arm portions. A plurality of mounting apertures receives an engagement portion of a seat post of a seat on a boat to secure the base to rest on a deck of the boat. A plurality of rod holders is pivotably coupled to the base top side of the arm portions. A holder bottom side of each rod holder is angled to rest flush on the base top side in a fish position. A cylindrical holder sidewall extends away from the base top side at an angle greater than 90°. Each rod holder secures a fishing rod and is pivotable back towards the base top side to allow for hook setting without removing the fishing rod.

11 Claims, 7 Drawing Sheets

(56) References Cited

U.S. PATENT DOCUMENTS

| | | | | |
|---|---|---|---|---|
| 6,681,517 | B1* | 1/2004 | Solomon | A01K 97/10 43/21.2 |
| 7,047,688 | B2* | 5/2006 | Sandman, Jr. | A01K 97/10 248/512 |
| 7,219,464 | B1* | 5/2007 | Kujawa | A01K 97/08 211/70.8 |
| 2003/0089021 | A1* | 5/2003 | Miller | A01K 97/10 43/21.2 |
| 2005/0102881 | A1* | 5/2005 | Legendziewicz | A01K 97/10 43/21.2 |
| 2007/0283614 | A1 | 12/2007 | Kessler | |
| 2013/0333268 | A1* | 12/2013 | Henry, Jr. | A01K 97/10 43/4.5 |
| 2014/0033600 | A1 | 2/2014 | McCorkle | |
| 2015/0018623 | A1* | 1/2015 | Friedrich | A61B 17/0206 600/206 |
| 2016/0045024 | A1* | 2/2016 | Roberts | A47F 7/0028 248/512 |
| 2020/0037594 | A1* | 2/2020 | Lohmeier | A01K 97/10 |

\* cited by examiner

DECK MOUNT FISHING ROD HOLDER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fishing rod holder devices and more particularly pertains to a new fishing rod holder device for securing fishing rods without clamps.

(2) Description of Related Art Including Information Disclosed Under 37 CFR 1.97 and 1.98

The prior art relates to fishing rod holder devices. Existing devices typically require a clamp to mount to the seat or side of a boat. Known rod holders also do not allow the rod to pivot and hinge without being removed.

BRIEF SUMMARY OF THE INVENTION

An embodiment of the disclosure meets the needs presented above by generally comprising a base having a base top side, a base bottom side, a mounting portion and a plurality of arm portions. Each arm portion lies coplanar with the mounting portion. The mounting portion has a plurality of mounting apertures extending from the base top side through the base bottom side of the mounting portion. Each mounting aperture is configured to receive an engagement portion of a seat post of a seat on a boat to secure the base to rest on a deck of the boat. A plurality of rod holders is coupled to the base. Each rod holder is pivotably coupled to the base top side on one of the arm portions. A holder bottom side of each rod holder is angled to rest flush on the base top side in a fish position. A cylindrical holder sidewall extends away from the base top side at an angle greater than 90°. The cylindrical holder sidewall is configured to receive a fishing rod through an open holder top side. Each rod holder is pivotable back towards the base top side to allow for hook setting without removing the fishing rod.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new fishing rod holder device embodying the principles and concepts of an embodiment of the disclosure and generally designated by the reference numeral 10 will be described.

As best illustrated in FIGS. 1 through 7, the deck mount fishing rod holder apparatus 10 generally comprises a base 12 having a base top side 14, a base bottom side 16, a mounting portion 18 and a plurality of arm portions 20. Each arm portion 20 lies coplanar with the mounting portion 18. The mounting portion 18 has a plurality of mounting apertures 22 extending from the base top side 14 through the base bottom side 16 of the mounting portion. The plurality of mounting apertures 22 may be three mounting apertures 22 arranged in an array. Each mounting aperture 22 is configured to receive an engagement portion 24 of a seat post 26 of a seat 28 on a boat 30 to secure the base 12 to rest on a deck 32 of the boat.

Figure 1:
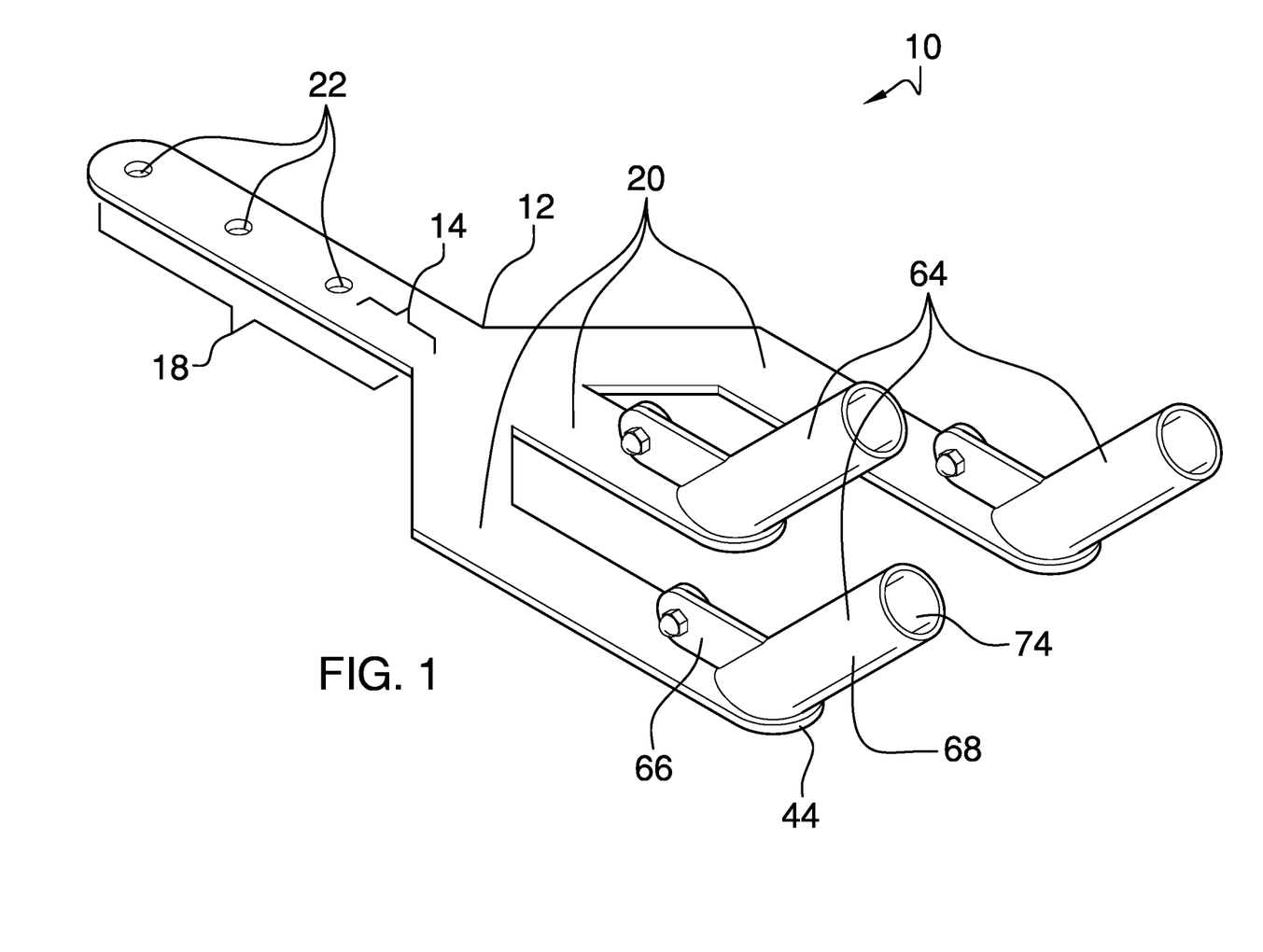
FIG. 1 is an isometric view of a deck mount fishing rod holder apparatus according to an embodiment of the disclosure.
Figure 2:
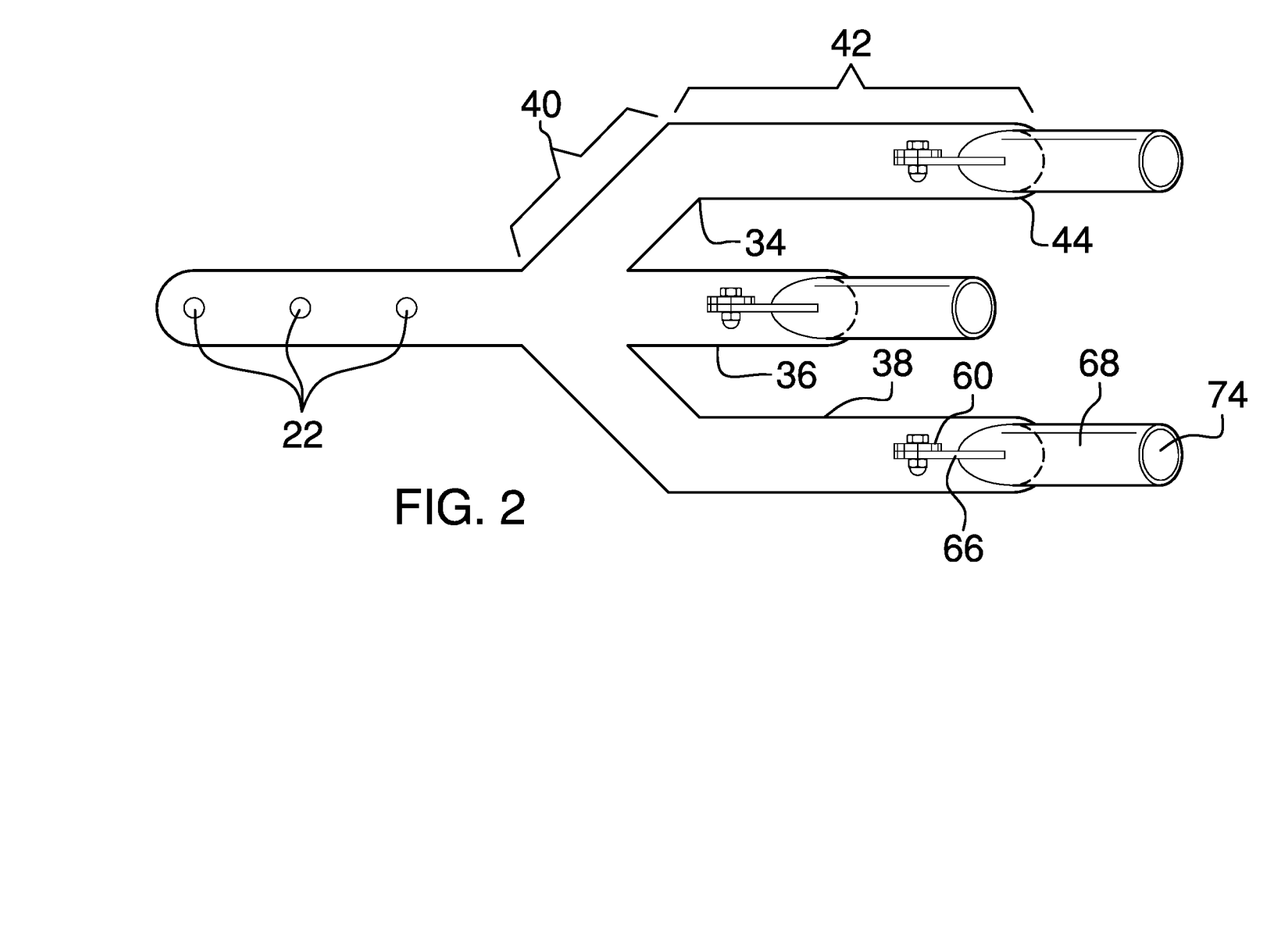
FIG. 2 is a top plan view of an embodiment of the disclosure.
Figure 3:
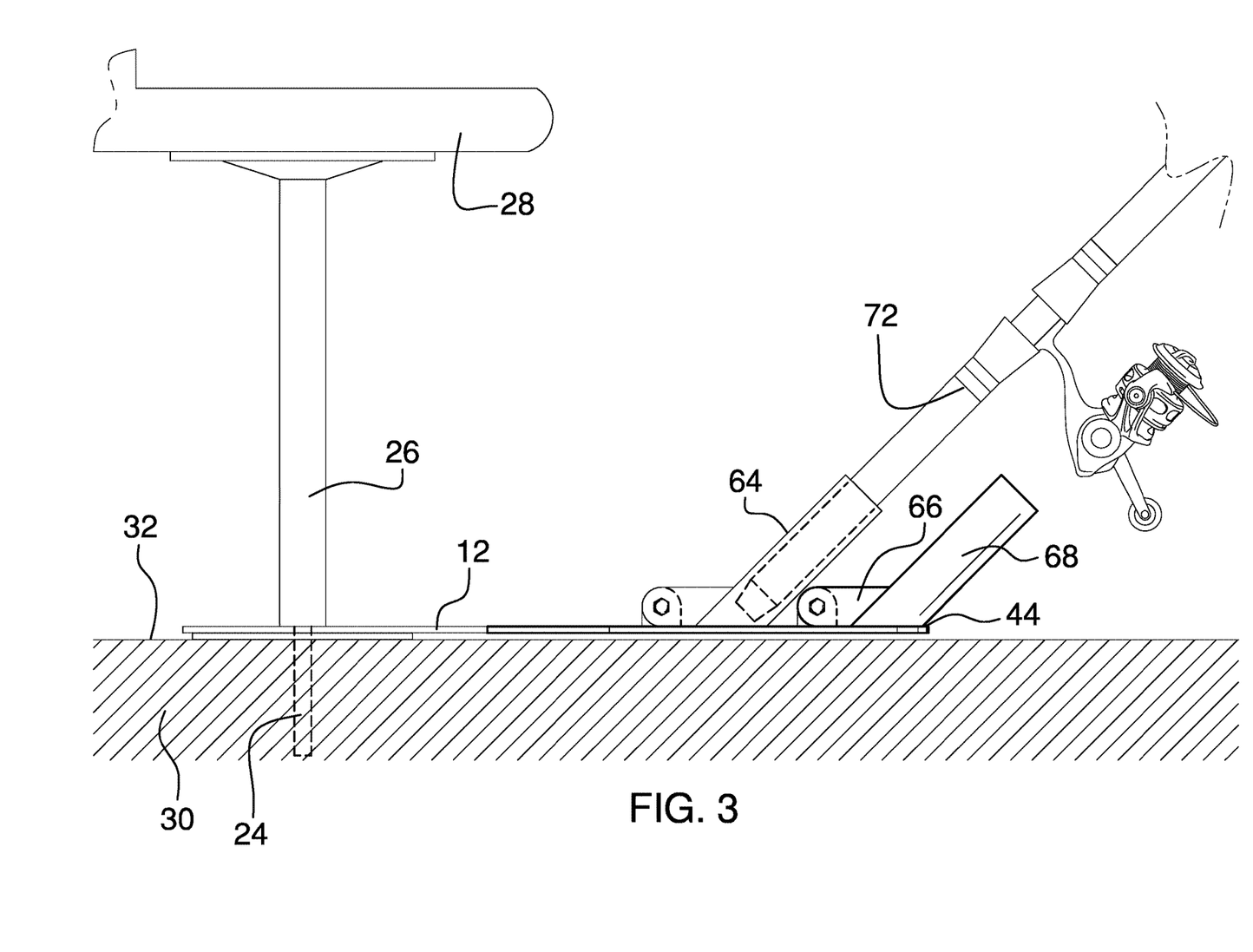
FIG. 3 is an in-use view of an embodiment of the disclosure.
Figure 4:
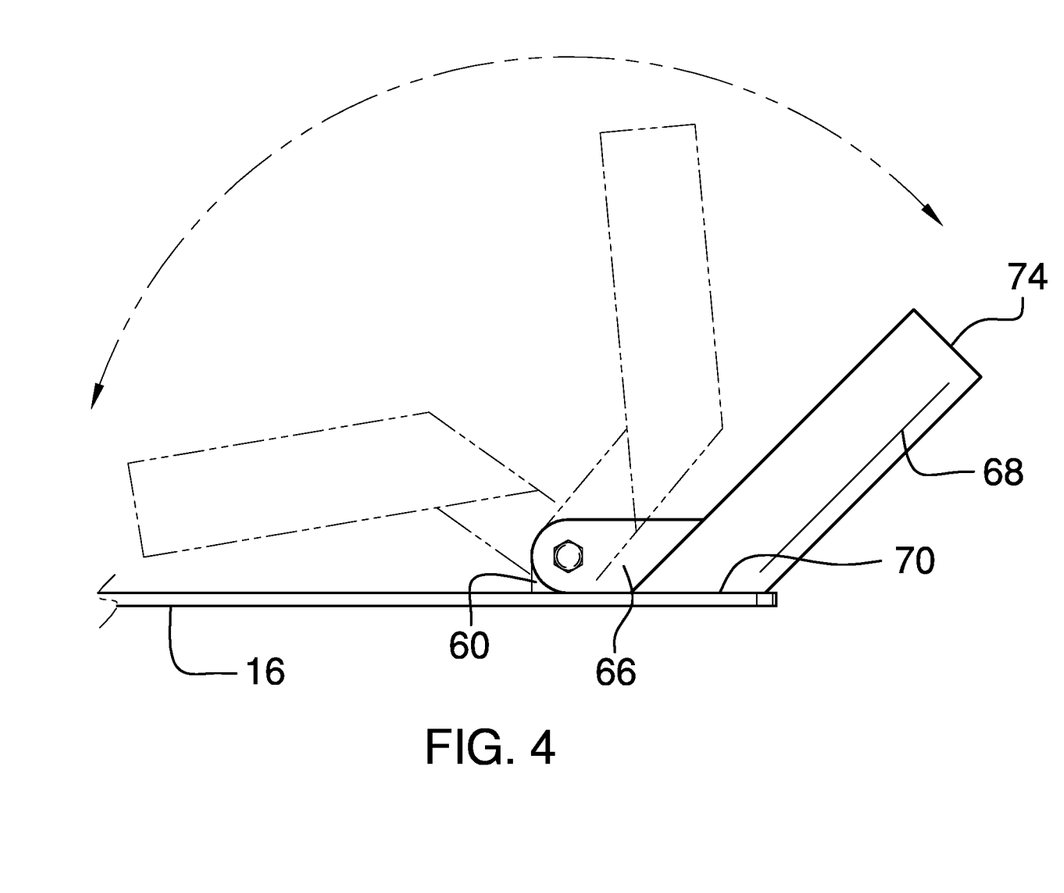
FIG. 4 is a side elevation view of an embodiment of the disclosure.

The plurality of arm portions 20 comprises a left arm portion 34, a medial arm portion 36, and a right arm portion 38. The medial arm portion 36 extends colinearly with the mounting portion 18. Each of the left arm portion 34 and the right arm portion 38 may have an angled section 40 and a parallel section 42 as seen in FIGS. 1 and 2. The parallel section 42 extends parallel with the medial arm portion 36. Each arm portion 20 may have a rounded distal end 44 with the distal end 44 of each of the left arm portion 34 and the right arm portion 38 extending past the distal end of the medial portion 36.

Figure 5:
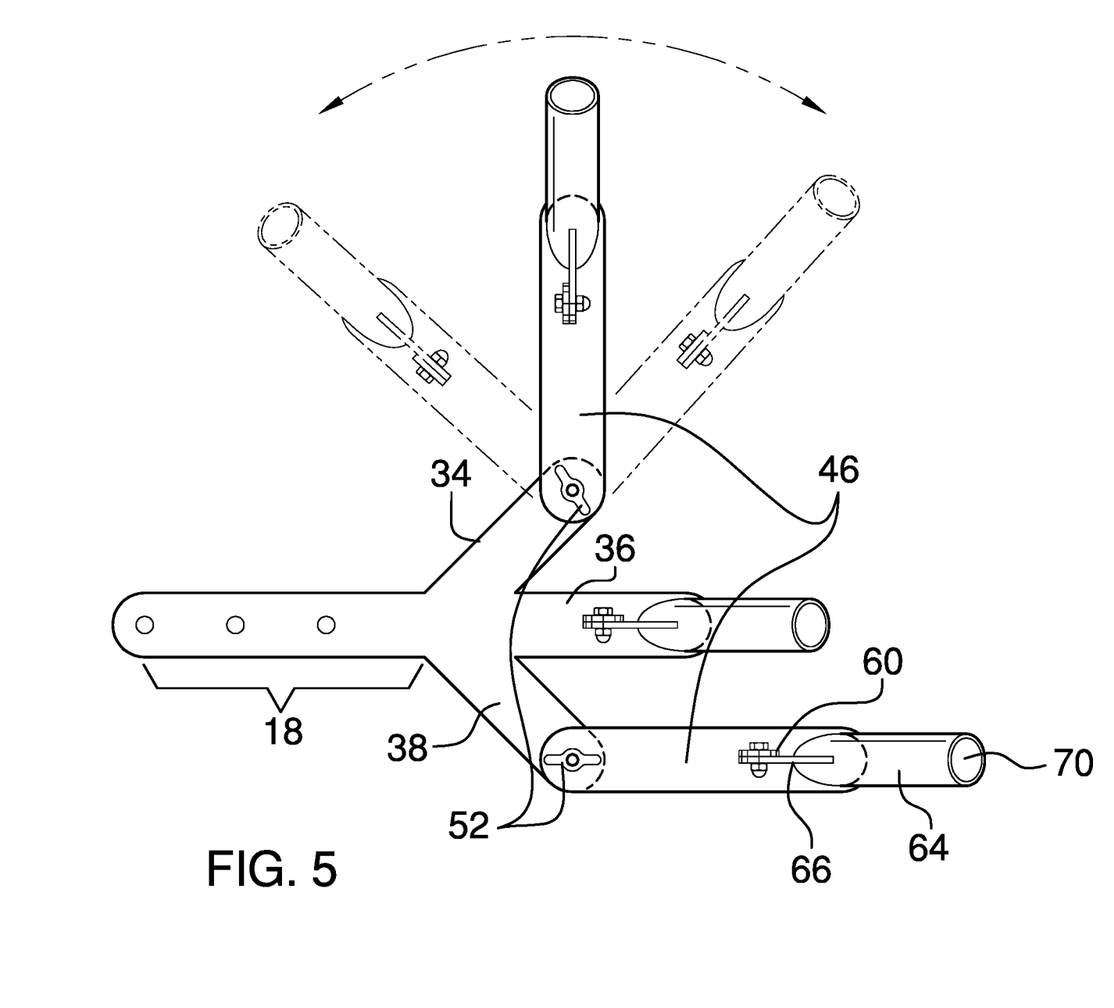
FIG. 5 is a top plan view of an embodiment of the disclosure.
Figure 6:
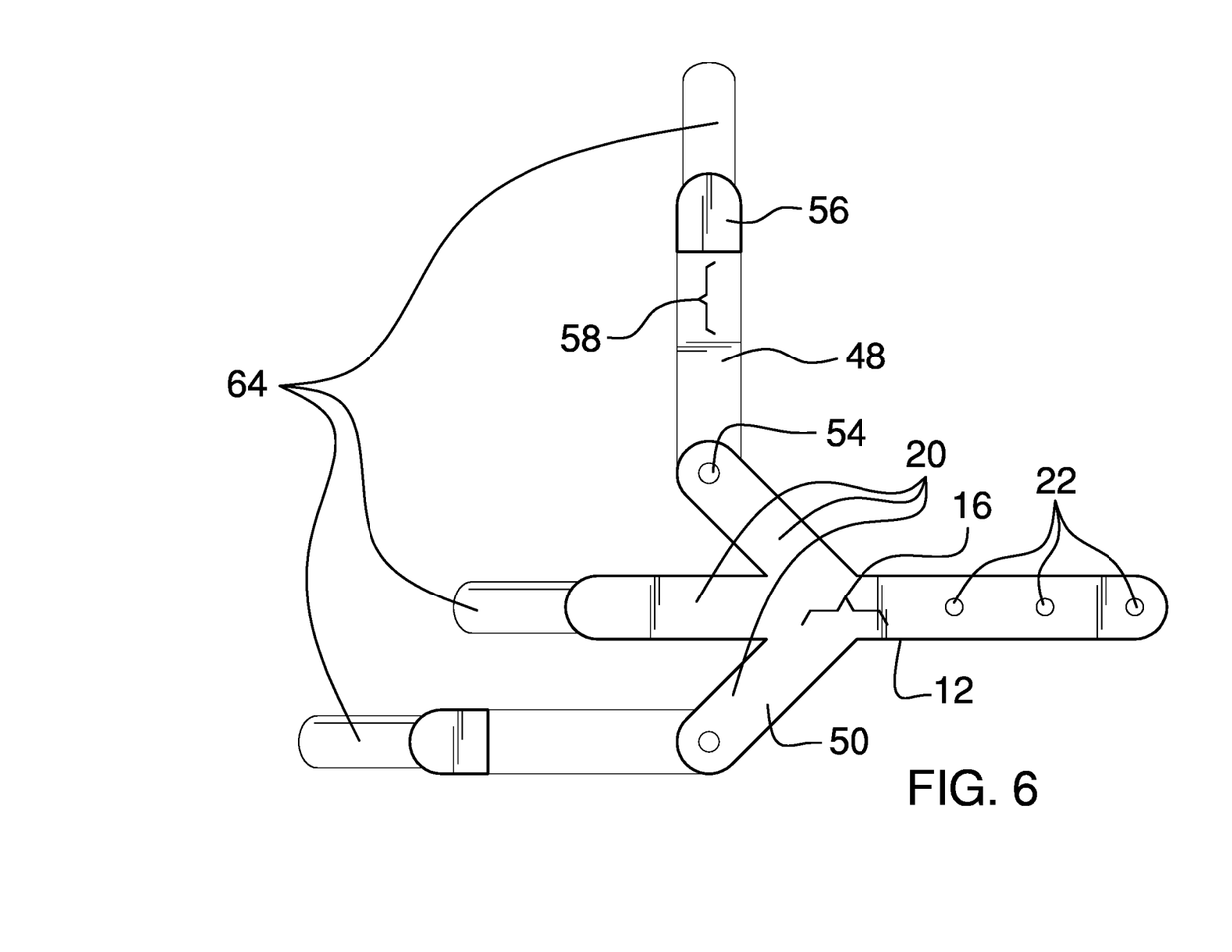
FIG. 6 is a bottom plan view of an embodiment of the disclosure.
Figure 7:
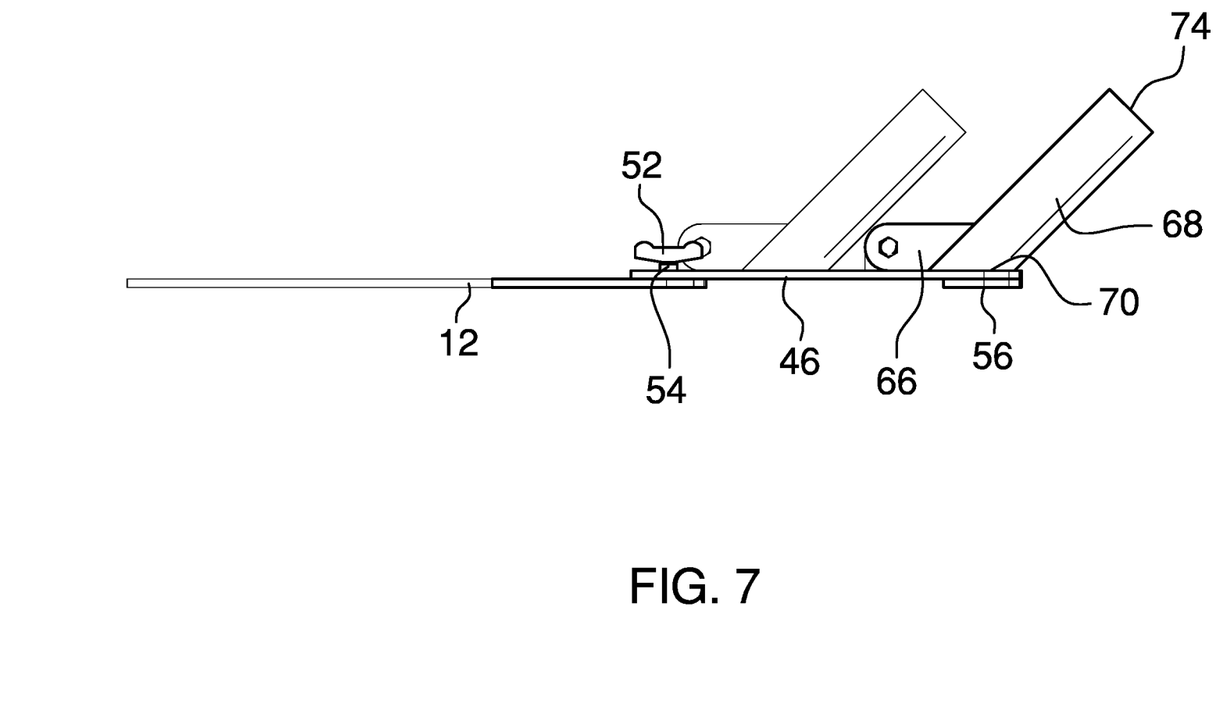
FIG. 7 is a side elevation view of an embodiment of the disclosure.

As seen in FIGS. 5-7, each of the left arm portion 34 and the right arm portion 38 may extend at an angle away from the medial arm portion 36 and a pair of pivot arms 46 may be coupled to the base 12. The pair of pivot arms 46 comprises a left pivot arm 48 pivotably coupled to the left arm portion 34 adjacent the distal end 44 thereof and a right pivot arm 50 pivotably coupled to the right arm portion 38 adjacent the distal end 44 thereof. A pair of locking handles 52 may be coupled to the pair of pivot arms 46. The pair of locking handles 52 is coupled to a pivot rod 54 of each pivot arm to selectively prevent and allow pivoting of the pivot arms 46. Each pivot arm 46 may have an arm support 56 coupled to an arm underside 58 thereof. The thickness of the arm support 56 is equal to the thickness of the base 12 in order to stabilize the pivot arms 46 on the deck 32 of the boat.

A plurality of mounting ears 60 is coupled to either the base top side 14 of one of the arm portions 20 or to an arm top side 62 of one of the pivot arms 46. A plurality of rod holders 64 is coupled to the plurality of mounting ears 60. Each rod holder 64 may have a pivot ear 66 extending from a cylindrical holder sidewall 68 adjacent a holder bottom side 70. The pivot ear 66 is pivotably coupled to one of the mounting ears 60. The holder bottom side 70 of each rod holder may be angled to rest flush on the arm top side 62 of the pivot arm or the base top side 14 in a fish position with the holder sidewall 68 extending away from the arm top side 62 or the base top side 14 at an angle greater than 90°. The cylindrical holder sidewall 68 is configured to receive a fishing rod 72 through an open holder top side 74. Each rod holder 64 is pivotable back towards the arm top side 62 or the base top side 14 to allow for hook setting without removing the fishing rod 72.

In use, the engagement portion 24 of the seat post is placed through the mounting aperture 22 to position the plurality of rod holders 64 a desired distance away from the seat 28. Fishing rods 72 are then placed within the plurality of rod holders 64 and left in the fish position until a bite is detected. The fishing rod 72 may then be pulled back to set the hook and pivot the fishing rod holder 64 back towards the arm top side 62 or the base top side 14. The pair of locking handles 52 may be used to selectively reposition the pair of pivot arms 46 as needed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A deck mount fishing rod holder apparatus comprising:
a base having a base top side, a base bottom side, a mounting portion and a plurality of arm portions, each arm portion lying coplanar with the mounting portion, the mounting portion having a plurality of mounting apertures extending from the base top side through the base bottom side of the mounting portion, each mounting aperture being configured to receive an engagement portion of a seat post of a seat on a boat to secure the base to rest on a deck of the boat; and
a plurality of rod holders, each of the rod holders being a cylindrical tube, each of the rod holders being coupled to the base top side on one of the arm portions, each rod holder having a holder bottom side being angled relative to a central longitudinal axis of the rod holder wherein the holder bottom side is positionable to rest parallel to and flush on the base top side in a fish position, each rod holder having a cylindrical holder sidewall extending away from the base top side at an angle, the cylindrical holder sidewall being configured to receive a fishing rod through an open holder top side, each rod holder being pivotable back towards the base top side to allow for hook setting without removing the fishing rod.

2. The deck mount fishing rod holder apparatus of claim 1 further comprising a plurality of mounting ears coupled to the base, each mounting ear being coupled to the base top side on one of the arm portions; each rod holder being pivotably, coupled to one of the mounting ears.

3. The deck mount fishing rod holder apparatus of claim 2 further comprising each rod holder having a pivot ear extending from the holder sidewall adjacent the holder bottom side, the pivot ear being pivotably coupled to one of the mounting ears.

4. The deck mount fishing rod holder apparatus of claim 1 further comprising the plurality of arm portions comprising a left arm portion, a medial arm portion, and a right arm portion.

5. The deck mount fishing rod holder apparatus of claim 4 further comprising the medial arm portion extending colinearly with the mounting portion, each of the left arm portion and the right arm portion having an angled section and a parallel section, the parallel section extending parallel with the medial arm portion.

6. The deck mount fishing rod holder apparatus of claim 4 further comprising each arm portion having a rounded distal end; the holder bottom side of each rod holder resting adjacent the rounded distal end in the fish position.

7. The deck mount fishing rod holder apparatus of claim 6 further comprising the distal end of each of the left arm portion and the right arm portion extending past the distal end of the medial portion.

8. A deck mount fishing rod holder apparatus comprising:
a base having a base top side, a base bottom side, a mounting portion and a plurality of arm portions, each arm portion lying coplanar with the mounting portion, the mounting portion having a plurality of mounting apertures extending from the base top side through the base bottom side of the mounting portion, each mounting aperture being configured to receive an engagement portion of a seat post of a seat on a boat to secure the base to rest on a deck of the boat, the plurality of arm portions comprising a left arm portion, a medial arm portion, and a right arm portion, the medial arm portion extending colinearly with the mounting portion, each of the left arm portion and the right arm portion having an angled section and a parallel section, the parallel section extending parallel with the medial arm portion, each arm portion having a rounded distal end, the distal end of each of the left arm portion and the right arm portion extending past the distal end of the medial portion;

a plurality of mounting ears coupled to the base, each mounting ear being coupled to the base top side on one of the arm portions; and a plurality of rod holders, each of the rod holders being a cylindrical tube, each of the rod holders being coupled to the base top side on one of the arm portions, each rod holder having a holder bottom side being angled relative to a central longitudinal axis of the rod holder wherein the holder bottom side is positionable to rest parallel to and flush on the base top side in a fish position, each rod holder having a cylindrical holder sidewall extending away from the base top side at an angle, the plurality of rod holders being coupled to the plurality of mounting ears, each rod holder having a pivot arm extending from a cylindrical holder sidewall adjacent a holder bottom side, the pivot arm being pivotably coupled to one of the mounting ears, the cylindrical holder sidewall being configured to receive a fishing rod through an open holder top side, each rod holder being pivotable back towards the base top side to allow for hook setting without removing the fishing rod.

9. A deck mount fishing rod holder apparatus comprising:

a base having a base top side, a base bottom side, a mounting portion and a plurality of arm portions, each arm portion lying coplanar with the mounting portion, the mounting portion having a plurality of mounting apertures extending from the base top side through the base bottom side of the mounting portion, each mounting aperture being configured to receive an engagement portion of a seat post of a seat on a boat to secure the base to rest on a deck of the boat, the plurality of arm portions comprising a left arm portion, a medial arm portion, and a right arm portion, the medial arm portion extending colinearly with the mounting portion, each of the left arm portion and the right arm portion extending at an angle away from the medial arm portion, each arm portion having a rounded distal end;

a pair of pivot arms coupled to the base, the pair of pivot arms comprising a left pivot arm pivotably coupled to the left arm portion adjacent the distal end thereof and a right pivot arm pivotably coupled to the right arm portion adjacent the distal end thereof;

a pair of locking handles coupled to the pair of pivot arms, the pair of locking handles being coupled to a pivot rod of each pivot arm to selectively prevent and allow pivoting of the pivot arms;

a plurality of mounting ears coupled to the base and the pivot arms, one mounting ear being coupled to the base top side on the medial arm portion and one mounting ear being coupled to an arm top side of each of the pivot arms; and a plurality of rod holders, each of the rod holders being a cylindrical tube, each of the rod holders being coupled to the base top side on one of the arm portions, each rod holder having a holder bottom side being angled relative to a central longitudinal axis of the rod holder wherein the holder bottom side is positionable to rest parallel to and flush on the base top side in a fish position, each rod holder having a cylindrical holder sidewall extending away from the base top side at an angle, the plurality of rod holders being coupled to the plurality of mounting ears, each rod holder having a pivot ear extending from a cylindrical holder sidewall adjacent a holder bottom side, the pivot arm being pivotably coupled to one of the mounting ears, the cylindrical holder sidewall being configured to receive a fishing rod through an open holder top side, each rod holder being pivotable back towards the arm top side or the base top side to allow for hook setting without removing the fishing rod.

10. The deck mount fishing rod holder apparatus of claim 9 further comprising each pivot arm having an arm support coupled to an arm underside thereof; the thickness of the arm support being equal to the thickness of the base.

11. The deck mount fishing rod holder apparatus of claim 9 further comprising each pivot arm being obround.

* * * * *